July 13, 1943.  W. J. ZENNER  2,323,958
TAPE TRANSMITTER DISTRIBUTOR
Filed Nov. 7, 1940  2 Sheets-Sheet 1

INVENTOR.
W. J. ZENNER
BY J. H. B. Whitfield
ATTORNEY.

July 13, 1943.  W. J. ZENNER  2,323,958
TAPE TRANSMITTER DISTRIBUTOR
Filed Nov. 7, 1940  2 Sheets-Sheet 2
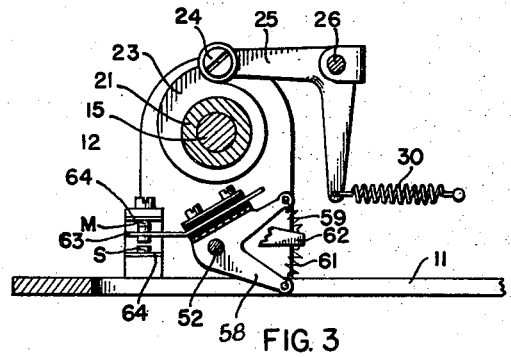
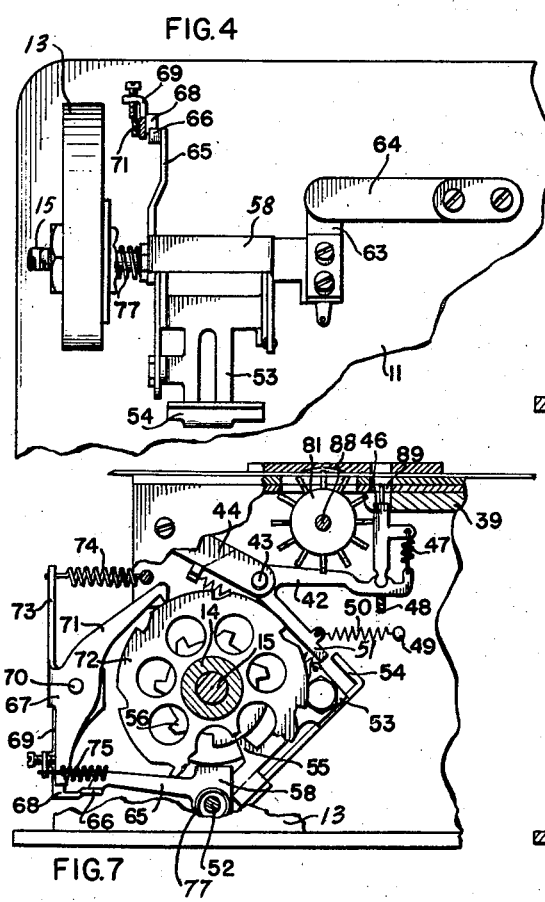
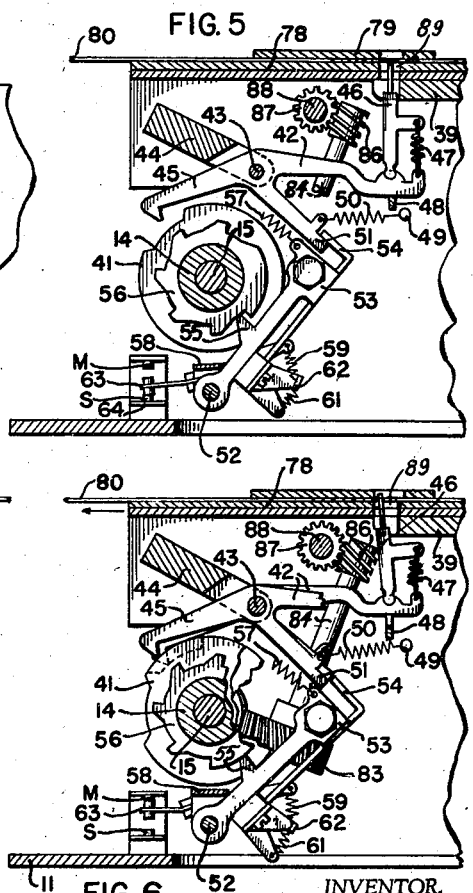
INVENTOR.
W. J. ZENNER
BY
ATTORNEY.

Patented July 13, 1943

2,323,958

UNITED STATES PATENT OFFICE 2,323,958

TAPE TRANSMITTER DISTRIBUTOR

Walter J. Zenner, Des Plaines, Ill., assignor to Teletype Corporation, Chicago, Ill., a corporation of Delaware Application November 7, 1940, Serial No. 364,636

17 Claims. (Cl. 178—17)

This invention relates to telegraph transmitters and more particularly to an automatic transmitter in which the transmission of signal impulses is under the control of a perforated tape.

The principal object of this invention is the provision of a telegraph transmitter wherein strip sensing mechanism and signal distributing mechanism are compactly and simply arranged as an integral unit to effect transmission of sharply defined signal impulses of uniform length.

An object of this invention is to provide a telegraph transmitter which is under the control of a continuously moving perforated tape and which includes a single set of transmitting contacts.

Another object of this invention is to provide a transmitting apparatus which is controlled by a continuously moving perforated tape and which is provided with sensing means adapted to move with the tape.

The invention features the use of a coarsely regulated signal probing member for determining the electrical characteristics of signal impulses and of an accurately cam regulated controlling lever for permitting the response of a single transmitting contactor at precise instants according to the determinations made by said probing member.

A further feature of this invention is to provide a tape sensing means capable of traveling with a continuously moving perforated tape.

In transmitting intelligence through the agency of a perforated tape, a sensing means operating in association with a rotary distributor has sometimes been employed. In the rotary distributor generally employed a rotating brush sweeps over a series of contacts completing the signaling circuit to transmit signal impulses. It has been found that brush distributors sometimes require a great deal of maintenance attention and for that reason the transmitter herein disclosed has been developed with a view toward eliminating the rotary distributor and thereby reducing materially the maintenance care required by the transmitting apparatus.

In one specific embodiment of the invention there is provided a feeding means for feeding continuously a perforated tape through a transmitting apparatus. A plurality of sensing elements, pivoted so as to be able to travel with the tape, is provided to sense the tape and thereby control the operation of a bail. There is articulated to the bail in a self-centering manner a member which carries the contactor of a single set of transmitting contacts and means is provided for locking the contactor carrying member in various positions. In operation, the sensing elements are successively operated to sense the tape and position the bail in accordance with the code combination to be transmitted. Between the operations of succeeding sensing elements, the lock on the contact carrying member momentarily is released, permitting that member to follow the positionment of the bail, and is again operated to lock the contact carrying member in position. The operation of the locking device determines the length of the signaling impulses by determining the time during which the contact carrying element holds the contacts closed.

For a more complete understanding of this invention reference may be had to the following detailed description and accompanying drawings, wherein:

Fig. 3 is an end elevational view showing the transmitting contact set and cam sleeve holding means;

Fig. 4 is a fragmentary plan view showing the contact carrying element and operating bail;

Fig. 5 is a sectional view on line 5—5 of Fig. 1 with the bail unblocked;

Fig. 6 is a side sectional view taken on a line similar to that on which Fig. 5 is taken by showing a different condition of operation, and Fig. 7 is a side section taken approximately on line 7—7 of Fig. 1.

Figure 1:
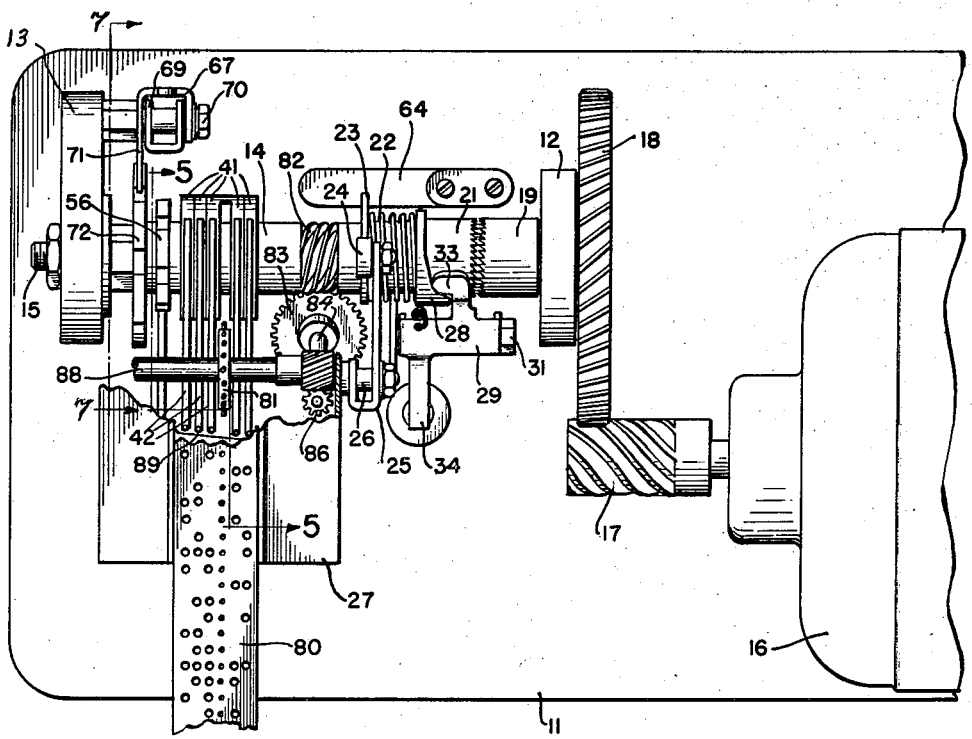
Fig. 1 is a fragmentary plan view of a transmitting apparatus embodying the features of this invention.

Referring to the drawings and more particularly to Fig. 1 there is disclosed a transmitting apparatus secured to a base member 11 provided with upstanding brackets 12 and 13 which rotatably support, preferably by means of roller bearings, a cam shaft 15. A constantly operating motor 16 is affixed to the base 11 and a worm 17 carried on the motor shaft engages a gear 18 secured to shaft 15 to impart a driving force to a cam sleeve 14 rotatably mounted on shaft 15. The driving force of motor 16 is imparted to the cam sleeve through the agency of a grab clutch comprising clutch members 19 and 21. Clutch member 19 is fixed to and rotates with shaft 15 whereas clutch member 21 is slidably mounted on shaft 15, and normally urged into clutching engagement by means of a spring 22 mounted coaxially with shaft 15 and abutting against clutch member 21 at one end and at its other end against a cam 23 carried by the cam sleeve 14. A jockey roller 24 (see Fig. 3) is carried by a bell crank lever 25 pivotally mounted on a stud 26 secured to a U-shaped frame member 27 carried by base 11 and cooperates with cam 23 for a purpose to be hereinafter described. Jockey roller 24 is urged into contact with the cam 23 by means of a spring 30 extending from bell crank lever 25 to a fixed part of the apparatus, such as the frame 27. A clutch throwout cam 28 (see Fig. 1) is carried by clutch member 21 and there is provided a clutch throwout lever 29 adapted to engage cam 28 and cam the clutch member 21 out of engagement with its mating clutch member 19. The clutch throwout lever 29, which is U-shaped, is rotatably supported on a stud 31 (see Fig. 2) projecting from an upstanding bracket mounted on a block 32 carried by the base 11. The clutch throwout lever 29 is provided with a rearwardly extending projection 33, as viewed in Fig. 1, to engage with cam 28 and bring about the disengagement of the clutch and a forwardly extending projection 34 which serves as the armature of a magnet 35.

With the clutch throwout lever 29 in engagement with throwout cam 28, as disclosed in Fig. 1, the clutch members 19 and 21 are separated so that the driving force of the motor 16 is not transmitted to the cam sleeve 14. Because the load on the cam sleeve 14 is relatively small, thrust spring 22 has a tendency to rotate the sleeve about shaft 15 by reason of the cam engagement between clutch throwout lever 29 and throwout cam 28 permitting the reengagement of the clutch elements 19 and 24. To prevent this undesirable effect of spring 22, the detenting cam 23 has been provided, and jockey roller 24 resting within the cam concavity (see Fig. 3) serves to hold cam sleeve 14 from rotation under the influence of spring 22. When magnet 35 is energized, it attracts its armature 34 pivoting the clutch throwout lever 29 about its stud 31 and retracts cam extension 33 from engagement with the clutch throwout cam 28 which permits the clutch elements to become engaged under the influence of spring 22. Inasmuch as jockey roller 24 rests within the concave depression in cam 23, the jockey roller presents a retarding force to the rotation of cam sleeve 14 requiring a full engagement of the clutch to overcome such force and, thereby, preventing clutch slippage upon the release of the clutch throwout lever.

Carried on cam sleeve 14 is a plurality of cams 41 for operating a corresponding plurality of sensing devices 42. The number employed, of course, will be determined by the particular unit code for which the transmitter is adapted. In this particular disclosure five such cams have been shown inasmuch as the transmitter is to be employed in the transmission of code signals of the five-unit code. To convert the apparatus to accommodate another, such as a six-unit code, it is merely necessary to provide an additional cam 41 on cam sleeve 14 and also a cooperating sensing device. Each cam is provided with a single depression and the cams are so arranged on the cam sleeve as to provide for the successive operation of the corresponding sensing devices.

The sensing elements indicated generally 42 are rotatably supported on a common shaft 43 which is carried by the teeth of a comb 44 affixed to the U-shaped member 27, as clearly disclosed in Fig. 6. The comb 44 further functions as a guide for the individual sensing devices. Each sensing device 42 comprises a cam follower arm 45 provided with a projecting tooth element at its leftward extremity, as viewed in Fig. 6, adapted to drop into the depression of the particular cam with which the sensing device is associated. At its rightward extremity each lever 42 carries a sensing finger 46, connected by means of a disc and socket joint so that the sensing finger is rockable with respect to the lever 42. With this construction a sensing finger which, upon being raised, has passed through a perforation in a continuously moving tape may by rocking leftwardly, (Figs. 5 and 6) travel to a limited extent therewith being pulled along by the tape. A comb 39 is carried by the horizontal portion of frame 27 and guides the sensing fingers 46 in their travel. This comb 39 limits the movement of the fingers to one plane and assures their correct positionment with respect to the tape. Each sensing finger is normally held in a vertical position by means of a spring 47 affixed to a stud on the finger and an apertured projection on the rightward extension of lever 42. A second comb member 48 (see Figs. 2 and 5) is provided near the rightward extremity of the levers 42 to serve as a guide means. This guide comb, like comb 44, is conveniently carried by the U-shaped frame 27. A stud 49, secured to frame 27, parallels comb 48 and has been provided as an anchor for a plurality of springs 50. Each spring 50 is distended between stud 49 and a depending blocking portion 51 of one of the levers 42 and serves to maintain the lever in engagement with its respective cam.

When operated to sense a tape, the finger 46 may assume either of two positions. That is, if the finger finds a perforation in the tape, the tooth projection on cam follower arm 45 may drop into its cam recess, rocking lever 42 counterclockwise about shaft 43 and placing projection 51 into its blocking position (see Fig. 6). If the vertical movement of the finger is impeded because there is no perforation in the tape into which the finger may pass, the projection on cam follower arm 45 will be prevented from dropping into its cam recess and, consequently, lever 42 will not rock about shaft 43, but will retain projection 51 in its nonblocking position (see Fig. 5).

A pivot rod 52 secured to upstanding bracket 13 and block 32 parallels shaft 15 and is disposed beneath the cam sleeve 14. Rotatably mounted on shaft 52 is a bail 53 provided with an upturned extension 54 and a cam projection 55 which operates as a cam follower of cam 56 secured to cam sleeve 14 adjacent to cams 41. A spring 57 is secured to a projection on bail 53 and a stud (not shown) on comb 44 and serves to maintain the cam projection 55 in engagement with cam 56. The cam 56 is provided with a depression for each of the cams 41 plus an additional depression for sending the start signal and in this case that cam is provided with six cam depressions.

As cam 56 rotates the cam following projection 55 causes bail 53 to oscillate about shaft 52. However, in oscillating, the upturned extension 54 of the bail overlaps depending portions 51 of levers 42. Accordingly, when a sensing finger has not passed into a perforation in the tape, the oscillation of the bail is permitted (see Fig. 5), whereas the operation of the bail is prevented by a blocking projection 51 when the sensing device finds a perforation in the tape (see Fig. 6).

Figure 2:
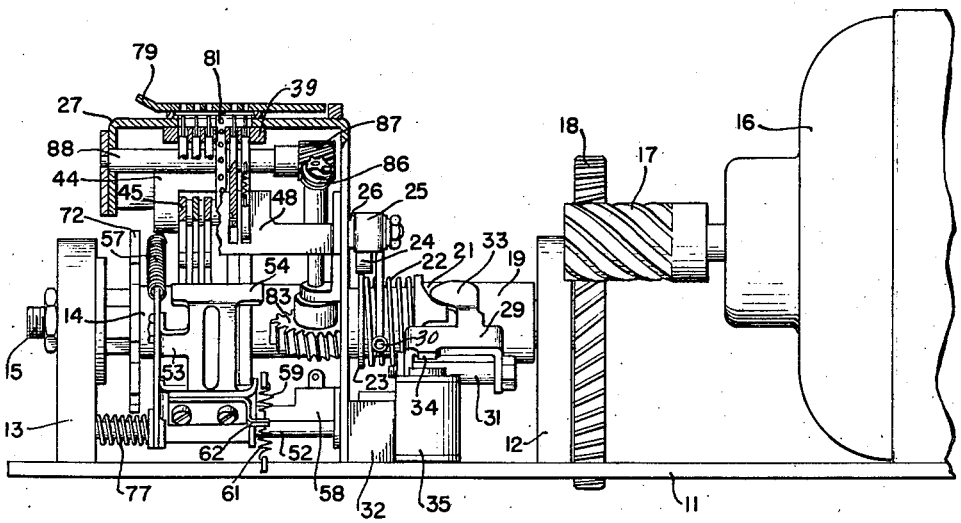
Fig. 2 is a side elevational view partly in section of the transmitter.

A U-shaped contact carrying member 58 is also pivotally mounted on shaft 52 and is provided at its rightward end, with a bifurcated rearwardly extending projection clearly disclosed in Fig. 2. A pair of springs 59 and 61 is connected between the terminals of the bifurcations of member 58 and a rearwardly extending projection 62 of the bail 53. This arrangement provides a self-centering feature for the contact carrying member 58 with respect to the projection 62 of the bail 53 so that, when the bail is moved under the influence of its cam 56 and spring 57, the contact carrying member will respond promptly when it is free to rotate about shaft 52.

A contactor element 63 is mounted on and insulated from the carrying member 58 (see Fig. 3). Contactor 63 is adapted to engage either contact of the pair of stationary contacts, designated M and S, which are carried on the contact springs 64, for the transmission of signal impulses. That contact designated M is the one which completes the circuit for the marking signal impulse while that designated S completes a similar circuit for transmitting a spacing signal impulse and, accordingly, the contacts may be connected to different polarities of a battery for the signal transmission or may be connected in a current no-current system. The particular signaling circuit employed is of no importance with respect to the particular invention here involved and hence the contacts are merely designated as M, marking, or S, spacing.

At the leftward extremity of the U-shaped contactor carrying member 58, as viewed in Fig. 4, means is provided for locking said carrying member in either of its contact making positions. A locking arm 65 (see Fig. 7) provided with an offset lug 66, which terminates in a knife edge, is carried by the carrying member 58 and is engaged by a cooperating locking pawl 67, also provided with a knife edge 68. The locking pawl 67 comprises a portion 69, provided with the aforementioned knife edge 68 and pivoted on a stud 70 secured to the upstanding bracket 13, and a cam following portion 71 also pivoted on stud 70 which cooperates with a locking cam 72 carried by the cam sleeve 14. The portion 71 is provided with a vertical projection 73 to which one end of a spring 74 is attached and at its other end the spring is attached to the frame member 27 to bias the cam follower portion 71 clockwise. Arm 69 is urged by a spring 75 in a counterclockwise direction so that its adjustable stop screw is yieldably in contact with the lowermost extremity of lever 71 at all times. The drop-offs in cam 72 are sheer so that the pawl 71 will drop abruptly into the cam recesses under the influence of spring 74, which is more powerful than spring 75, to afford a sharp release of the locking means and each cam recess is relatively short so that the contactor carrying member remains unlocked for a very short period of time. Preferably, the locking means remains released only for that period of time required by the member 58 to shift contact 63 from M to S, or vice versa, before it is again locked in position by the cam following portion 71 riding onto the high, or locking portion of cam 72.

The knife edges 68 and 66 are provided to enable the lever 71 to engage the locking arm 65 with a minimum of possibility for these elements to abut one another and thus fail to lock. However, the spring 75 provides the necessary yield in the locking arrangement so that should the pawl and locking lever 66 come into abutting relation rather than the overlapped locking relation, as seen in Fig. 7, the pawl portion 71 may be rocked in a counterclockwise direction under the action of cam 72 and yet the spring 75 will provide the necessary yield so that the pawl 70 may not be damaged due to the collision of the pawl with lock lever 65. The spring 77, within which the shaft 52 extends, serves to maintain the proper positionment of the U-shaped contactor carrying lever 58 and the bail 53 along the shaft 52 and at the same time tends to prevent chattering at the contacts M and S by damping the action of yoke 58.

The cam 72 is provided with a depression for each of the cams 41 as well as a depression for start and stop, and the orientation of this cam with respect to the remaining cams on the cam sleeve 14 is important as will hereinafter be more fully described.

A shallow channel member 78 is affixed to the horizontal portion of the frame 27 and provides a guideway by which a tape 80 is guided. A hold-down-plate 79 is pivotally carried by the frame 27 through pintles (not shown) and, when it is in the position shown in Fig. 2, it serves to confine the tape within the guideway 78. The plate 79, since it is provided with pintles, may be raised to uncover the tape and permit its facile removal from the transmitter. The tape 80 is provided with regularly spaced feed perforations into which feed teeth of a feed wheel 81 project to advance the tape along the guideway 78. The present invention contemplates a continuous feeding of the tape as distinguished from an intermittent motion feeding and for that purpose the feed wheel 81 is continuously rotated. The cam sleeve 14 is provided with a driving worm 82 which engages a gear 83 secured to an extremity of an inclined shaft 84 to the opposite end of which is affixed a worm 86 meshing with a gear 87 carried by a shaft 88. Shaft 88 is rotatably mounted in the frame 27 and carries the feed wheel 81 and by means of this gear drive the feed wheel 81 will rotate proportionally to the cam sleeve 14.

As hereinbefore described, the individual sensing devices 42 are operated successively and the tape moves continuously through the transmitter. With this mode of operation, the tape is advanced a small distance during the time which intervenes the operation of successive sensing devices. The cumulative effect of these small movements of the tape makes it necessary that the perforations in the tape extend at a slight angle across the tape rather than be perpendicular to the line of movement of the tape, or that the sensing fingers 46 be disposed across the path of the tape at a slight angle. The latter expedient has been employed here and, therefore, the slot 89 in the guideway 78 is similarly positioned at an angle to provide for the reception of the sensing fingers and, further, this slot is of a considerable width so that the fingers may have room in which to travel with the tape as aforementioned.

The transmitting apparatus above described is particularly adapted for transmitting signaling impulses from a perforated tape, the perforations of which correspond to code combinations of the five-unit start-stop code, although the specific code employed is of no importance with respect to the merits and features of the present invention. In operation, the tape passes from a tape perforator (not shown) to the transmitting apparatus to be sensed. Interposed between the perforating unit and the transmitter is a taut tape contact arm (not shown) to interrupt the operation of the transmitting apparatus when the perforator has ceased perforating the tape and the portion of the tape between the transmitter and perforator has become taut due to the feeding of the tape through the transmitter. When the taut tape contact arm is operated, a circuit is opened to de-energize the magnet 35 so that a spring (not shown) which is connected to the clutch throwout lever 29 will draw the cam projection 33 into camming relation with the clutch throwout cam 28 to disengage the clutch and cause the arrestment of the cam sleeve 14. Otherwise when the tape between the transmitter and perforator is not taut, magnet 35 remains energized holding the clutch throwout lever 29 out of camming relation with the clutch throwout cam 28 so that the cam sleeve 14 rotates continuously and through the gear drive aforedescribed the tape 80 is fed continuously through the transmitting apparatus. In U. S. Patent 1,997,601 issued to A. H. Reiber there is disclosed a taut tape arm which may thus be employed.

Upon the release of clutch throwout cam 28 the cam sleeve 14 commences to rotate and the orientation of the cams on that sleeve is such that the bail operating cam 56 will almost immediately present the start depression of the cam to the cam follower projection 55 and, since all of the levers 42 are riding on the high portions of their respective cams at that moment, their blocking projections 51 are depressed and bail 53 is permitted to rotate on shaft 52 into the position shown in Fig. 5. Since the contact carrying member 58 is locked at this particular time, spring 61 becomes tensioned but a counterclockwise torque is imparted to the contactor carrying yoke 58. Shortly thereafter, locking cam 72 presents a depression to the locking pawl 67 releasing its locking engagement with the contact carrying member 58 and through the self-centering connection of the contact carrying member with the bail 53, the contact carrying member is rotated in a counterclockwise direction about shaft 52 to present the contact 63 into engagement with the spacing contact S and thus the start impulse is transmitted. Since the depressions in the locking cam 72 are brief, the contact carrying element remains unlocked for but a very short period of time and hence the cam operates immediately to lock the contactor spacing position to assure the continuance of the space impulse for the desired period of time. Following this, the recess of cam 56 passes from above cam projection 55 and an oncoming apex of cam 56 rotates bail 53 clockwise about shaft 52 to withdraw the bail extension 54 from overlapping relation with the blocking projections 51 and this motion tensions spring 59.

As the cam sleeve continues to rotate the first cam 41 presents a depression to the first cam follower arm 45 and the spring 50 of that particular lever tends to rotate the cam follower arm counterclockwise about its pivot 43 into the cam recess. If the first unit of the code combination to be transmitted is a marking impulse, there is found a perforation in the tape presented over the first sensing element 46 at this particular time permitting the lever 42 to be rotated about its shaft 43 and the sensing finger 46 thrust through the tape. This rotation of the lever 42 elevates the blocking projection 51 into the path of the bail extension 54 so that as cam 56 presents the next cam depression to its follower 55, the elevated projection 51 prevents the bail probing extension 54 and bail 53 from rocking counterclockwise under the influence of its spring 57 and the projection 62 remains in its lower position as shown in Fig. 6 to which it was moved during the first impulse period. Since contactor 63 is held against the S contact, spring 59 remains tensioned, and as cam 72 momentarily releases the locking blade 68, member 58 is freed and permitted to be rocked clockwise by spring 59 placing contact 63 in engagement with contact M. Through the continued rotation of cam sleeve 14, the member 58 is relocked, recess of cam 56 passes from above projection 55, and the recess of first cam 41 passes from beneath its cam follower on first lever 42, in the order recited. Thus, the transmission of the first code combination impulse of the signal combination is completed.

In continuing its rotation the cam sleeve 14 positions the second cam 41 with its recess beneath its associated cam follower arm 45 and, assuming that the second impulse of the signal combination to be transmitted is a spacing impulse, there is no perforation in the tape through which the second sensing finger 46 may pass and hence, the cam follower arm 45 is prevented from dropping into the recess in its associated cam 41 under the influence of spring 50. Consequently, the projection 51 remains in its lowermost position and the operation of the bail 53 is not blocked. Cam sleeve 14 then presents a recess of cam 56 to the follower 55 and through the agency of spring 57 the bail 53 is rotated into its counterclockwise position, with the extension 54 overlapping projections 51 and tensioning the spring 61 of the self-centering device as above-described. In timed relation to this operation of the bail 53, the locking cam 72 releases the locking means on the contact carrying member 58 permitting that member to be rotated in a counterclockwise direction on shaft 52 to bring contact 63 into engagement with contact S and then immediately lock the contact carrying member in this new position. Thereafter the bail again rides onto the high portion of its cam 56, restoring the bail to its normal position and the recess of the particular cam 41 passes from beneath the cam follower arm 45 to restore that cam follower to its normal position. This completes the transmission of a spacing impulse of the particular signal combination.

In like manner the remaining elements of the signal combination are transmitted and the arrangement of the cams on cam sleeve 14 assures the successive operation of the cams 41, bail cam 56 and locking cam 72 in a timed sequence to carry out the signal impulse transmission in the manner above-described. Following the transmission of the fifth impulse of the five-unit code signal combination, the cam follower arms 45 and the cam projection 55 are riding on the high portions of their respective cams and spring 59 is tensioned or not depending on whether the fifth pulse was of a marking or spacing nature. The cam sleeve 14 in completing its cycle of revolution, positions the seventh recess of cam 72 beneath its follower to release the contact carrying member 58 which positions contact 63 into engagement with contact M and is then locked by cam 72 in this position as the transmission cycle is completed. This final positioning of contact 63 is required for the transmission of the stop impulse.

During the signal transmission the gear drive affords a continuous rotation of feed wheel 81 and the perforated tape is continuously moved through the transmitting apparatus until, upon the exhaustion of tape, the operation of the taut tape release arm is effected, magnet 35 is de-energized causing an interruption in the operation of the transmitting apparatus.

The ball and socket connections between the tape sensing fingers 46 and the levers 42 permit the sensing fingers of those levers 42 which encounter perforations in the tape to travel with the tape by reason of which the tape moves continuously without rupturing though the fingers pass through the tape. Should the sensing fingers not be permitted to travel with the tape, the tape would obviously be torn.

Although a particular embodiment of this invention has been disclosed and described, it is to be understood that the invention is thereby not restricted as many modifications and rearrangements of the apparatus are permissible without departing from the spirit of the invention. The scope of the invention is to be determined by the appended claims.

What is claimed is:

1. An automatic impulse transmitter comprising a plurality of tape sensing elements, a plurality of cams for successively controlling said sensing elements, a plurality of cam follower levers interconnecting said sensing elements and said cams, a bail controlled by said sensing elements, a cam for timing the operation of said bail with respect to the operation of said sensing elements, and a single set of transmitting contacts controlled by said bail.

2. In an apparatus for transmitting impulses, a plurality of tape sensing elements, a corresponding plurality of cams for operating said sensing elements, a single set of transmitting contacts, a signal impulse demarking cam, a bail controlled permissively by said demarking cam for operating said transmitting contacts, and means controlled by said sensing elements for blocking the operation of said bail.

3. In an apparatus for transmitting impulses, a plurality of means for sensing a tape, means for operating said sensing means successively, a single set of transmitting contacts, means for operating said contacts, said last named means being controlled by said sensing means, and means for timing the operation of said contact operating means with respect to the operation of said sensing elements.

4. In an apparatus for transmitting impulses, a plurality of means for sensing a tape, means for moving said sensing means into record probing position successively, a single set of transmitting contacts, means for operating said contacts, said last named means being controlled by said sensing means, and means for timing the operation of said contact operating means with respect to the operation of said sensing elements.

5. In an impulse transmitting apparatus, a plurality of tape sensing means, a single set of transmitting contacts, means under the control of said sensing means for operating said transmitting contacts, and a cam assembly comprising cams for operating said sensing means successively, and a cam for operating said contact operating means in timed relation to the operation of said sensing means.

6. An automatic impulse transmitter comprising tape sensing means, means for operating said sensing means, a single set of transmitting contacts, a cyclically rotatable cam, means for including said cam operating said transmitting contacts in timed relation to the operation of said sensing means, and barrier means on said sensing means for preventing the operation of said transmitting contact operating means.

7. In an impulse transmitting apparatus, a plurality of tape sensing elements, a plurality of cams for operating said sensing elements successively, cam follower levers connecting said sensing elements and said cams, a single set of transmitting contacts, a bail, a cam for operating said bail to actuate said transmitting contacts, and a projection on said cam follower levers to remove said bail from the control of the bail operating cam.

8. In an impulse transmitting apparatus, means for sensing a tape, a single set of transmitting contacts having two positions, a bail for actuating said contacts, locking means for holding said contacts in either position, means for operating said bail in accordance with the operation of the tape sensing means and while the contacts are held locked, means for subsequently releasing the locking means, and spring means for connecting said contacts to said bail in a self-centering manner whereby said contact will automatically follow said bail.

9. In a telegraph transmitter, a constantly rotating feed wheel for feeding a tape continuously, tape sensing means to travel with the tape, a bail controlled by said sensing means, a signal impulse transmitter actuated by said bail, and timing means to cause the operation of said sensing means, said bail, and said transmitter in timed relation to one another.

10. An automatic impulse transmitter comprising means for continuously feeding a tape, a plurality of tape sensing elements to travel with the tape, means for operating said sensing elements, a single set of transmitting contacts, a bail for actuating said contacts, means associated with said sensing means for controlling said bail, and timing means to cause the operation of said bail in timed relation to the operation of said sensing elements.

11. In a telegraph transmitter, means for continuously feeding a tape, a plurality of sensing elements to travel with the tape, a corresponding plurality of cams to operate said elements successively, a bail controlled by said elements, a single set of transmitting contacts controlled by said bail, and timing mechanism to cause the operation of said bail and said transmitting contacts in timed relation to the operation of each sensing element.

12. An automatic impulse transmitter comprising a plurality of tape sensing elements, a single set of transmitting contacts, a bail for operating said contacts in accordance with the operation of said sensing elements, locking means for the transmitting contacts, and a cam assembly including cams for operating said sensing elements, said bail, and said locking means in timed relation to one another.

13. An apparatus for transmitting signaling impulses comprising a plurality of tape sensing elements, a single set of transmitting contacts, a bail for operating said contacts in accordance with the operation of said sensing elements, locking means for the transmitting contacts, and means to operate said sensing elements successively and to operate both the bail and contact locking means intermittent the operation of succeeeding sensing elements.

14. In an impulse transmitting apparatus, a plurality of tape sensing elements, a plurality of cams for successively operating said sensing elements, a single set of transmitting contacts, a contact carrying element engageable with said transmitting contacts, a shaft upon which said element is rotatably mounted, a bail for positioning said element about said shaft with respect to said transmitting contacts, said bail being controlled by said sensing elements, a projection carried by said bail, and a self-centering resilient connection between said projection and said contact carrying element.

15. In a transmitting apparatus, a cyclically rotatable shaft, a set of tape sensing feelers sequentially operative under the control of said shaft, means for drawing a control form through a zone of operation of said feelers, a contactor for generating line signals in accordance with the signal conditions of said form determined by said feelers, apparatus for establishing a direction of operation of said contactor according to the positions of each of said feelers, and means timed by said shaft for determining the instant of operation of said contactor according to said direction establishing apparatus.

16. In a tape transmitting mechanism, a set of feeler levers, means for actuating said feeler levers successively, a signal generating mechanism, means for conditioning said mechanism successively according to the successive operations of said feelers, and a timed release mechanism for initiating the operation of said signal generating mechanism to occur at precise intervals according to a predetermined signal pattern.

17. In a single contact transmitter, a contactor connected to a line and movable between alterative signaling impulses, a set of tape sensing elements operative successively for determining the nature of signal components in a tape, a cyclically rotatable shaft for timing the operations of said sensing elements, and means for determining the direction of operation of said contactor in response to the performance of said sensing elements and the instant of operation of said contactor in accordance with the position of said shaft.

WALTER J. ZENNER.